United States Patent
Love et al.

(10) Patent No.: US 12,309,130 B2
(45) Date of Patent: May 20, 2025

(54) SYSTEM AND METHOD FOR DECENTRALIZED USER CONTROLLED SOCIAL MEDIA

(71) Applicant: TrofiVentures LLC, Austin, TX (US)

(72) Inventors: Mike Love, Austin, TX (US); Blake Love, Austin, TX (US)

(73) Assignee: TrofiVentures LLC, Austin, TX (US)

( * ) Notice: Subject to any disclaimer, the term of this patent is extended or adjusted under 35 U.S.C. 154(b) by 56 days.

(21) Appl. No.: 17/970,384

(22) Filed: Oct. 20, 2022

(65) Prior Publication Data

US 2023/0137345 A1    May 4, 2023

Related U.S. Application Data

(60) Provisional application No. 63/263,202, filed on Oct. 28, 2021.

(51) Int. Cl.
 *H04L 9/40* (2022.01)
(52) U.S. Cl.
 CPC .................... *H04L 63/08* (2013.01)
(58) Field of Classification Search
 CPC ..................................... H04L 63/08
 See application file for complete search history.

(56) References Cited

U.S. PATENT DOCUMENTS

| | | | |
|---|---|---|---|
| 2016/0044071 A1* | 2/2016 | Sandholm | H04L 67/02 709/204 |
| 2019/0121813 A1* | 4/2019 | Galebach | H04L 9/3239 |
| 2020/0169545 A1* | 5/2020 | Caldwell | H04L 63/0428 |
| 2021/0173955 A1* | 6/2021 | Gupta | G06F 11/3024 |

OTHER PUBLICATIONS

International Search Report and Written Opinion received for PCT Patent Application No. PCT/US22/47819, mailed on Feb. 1, 2023, 10 pages.

* cited by examiner

*Primary Examiner* — Hee Soo Kim
(74) *Attorney, Agent, or Firm* — Workman Nydegger (57) ABSTRACT

A computer system for accessing a decentralized user controlled social media platform receives, from an user computing device, a user authentication token for the decentralized user controlled social media platform. The computer system determines that the user authentication token is valid for access to a user account at the decentralized user controlled social media platform. Additionally, the computer system requests, through a network connection, content from a plurality of remote servers. Each of the plurality of remote servers requires a unique remote server authentication token to access a portion of the content stored at the respective remote server. Further, the computer system communicates, to the user computing device, the content received from the plurality of remote servers.

18 Claims, 4 Drawing Sheets

SYSTEM AND METHOD FOR DECENTRALIZED USER CONTROLLED SOCIAL MEDIA

CROSS-REFERENCE TO RELATED APPLICATION(S)

This application claims the benefit of U.S. Provisional Patent Application No. 63/263,202, filed on Oct. 28, 2021, and entitled "SYSTEM AND METHOD FOR DECENTRALIZED USER CONTROLLED SOCIAL MEDIA." The entire contents of each of the above applications is incorporated herein by reference in their entireties.

BACKGROUND

Computers and computing systems have affected nearly every aspect of modern living. Computers are generally involved in work, recreation, healthcare, transportation, entertainment, household management and the economy. Specialized computing systems referred to as Social Media platforms such as Facebook and Twitter use global networks and centralized websites to enable messaging and content sharing among billions of users. These platforms have become ubiquitous on a global scale to the extent they now wield immense power to significantly influence popular opinion.

As these social media platforms have grown, they have become worldwide centers of public discussion. The ability to control and shape public discussion has placed social media platforms in positions of tremendous power and controversy. In recent times, social media platforms have been leveraged to shape political outcomes in both permissible and abusive ways.

Additionally, the power of social media platforms has placed them in a position to censor public speech. The censorship of public speech may take the form of preventing certain individuals from participating on a social media platform or by censoring specific subject matter on a social media platform. The ability of social media platforms to control such a broad swath of modern speech has raised the ire of both the public and of political institutions.

Accordingly, there are many problems with the technology that forms the basis of social media platforms.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer system for accessing a decentralized user controlled social media platform. For example, the computer system receives, from an user computing device, a user authentication token for the decentralized user controlled social media platform. The computer system determines that the user authentication token is valid for access to a user account at the decentralized user controlled social media platform. Additionally, the computer system requests, through a network connection, content from a plurality of remote servers. Each of the plurality of remote servers requires a unique remote server authentication token to access a portion of the content stored at the respective remote server. Further, the computer system communicates, to the user computing device, the content received from the plurality of remote servers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Disclosed embodiments include a decentralized user controlled social media platform. As used herein a "decentralized user controlled social media platform" comprises a social media platform that has decentralized storage of the content that is shared on the social media platform. More specifically, in some embodiments the decentralized user controlled social media platform comprises a social media platform that leverages content that is stored in user-controlled cloud storage accounts. The user-controlled cloud storage accounts may be operated by third-party cloud storage providers, such as Dropbox™, Onedrive™, Google Drive™, iCloud™, and other similar cloud storage providers.

In some embodiments, each user has complete control over the content they share with the decentralized user controlled social media platform. For example, the decentralized user controlled social media platform does not locally store the user content, as such, the content is only stored and available through the user-controlled cloud storage account. Accordingly, the user can completely remove content from the social media platform simply by deleting the content within his cloud storage account.

Further, in at least one embodiment, when content on the decentralized user controlled social media platform is shared, the actual content is not copied. Instead, an envelope is created that comprises a pointer to the content within the user-controlled cloud storage account. The envelope comprises a template for how the content is to be displayed within the decentralized user controlled social media platform. The envelope may also contain comments, likes, shares, and other social-media-platform-specific data. When another user reshares the content within the decentralized user controlled social media platform, a new envelope is generated that points to the content. As such, the new posting may start with new comments, new likes, and other new content that is specific to the social media platform; however, the newly shared content will not actually create a second copy of the content.

One will appreciate in view of this disclosure that disclosed embodiments provide a user with greater control over their own content. Such control addresses many developing concerns relating to the exploitation of user content for monetary purposes via advertising by conventional social media platforms. Further, disclosed embodiments may reduce the significant costs of cloud computing infrastructure that are often required by conventional social media platforms. Instead, the disclosed social media platform leverages the user's individual cloud storage accounts to host the bulk of content within the decentralized user controlled social media platform.

Additionally, in at least one embodiment, the decentralized user controlled social media platform reduces or eliminates the ability of social media platforms to censor content within the social media platform. In particular, the decentralized user controlled social media platform does not host the actual content, as such, the end user has significantly more control over how the content is presented and whether the content is presented. Additionally, the decentralized user controlled social media platform allows individual users to have greater control over the monetization of their content. For example, since the content is owned and controlled by the user, the user is able to independently monetize their content through an agreement with their cloud storage provider or through an agreement with the decentralized user controlled social media platform. Further, in some embodiments, a user may host their own cloud storage platform, as such, the user may have complete control over the traffic and monetization of their content.

Figure 1:
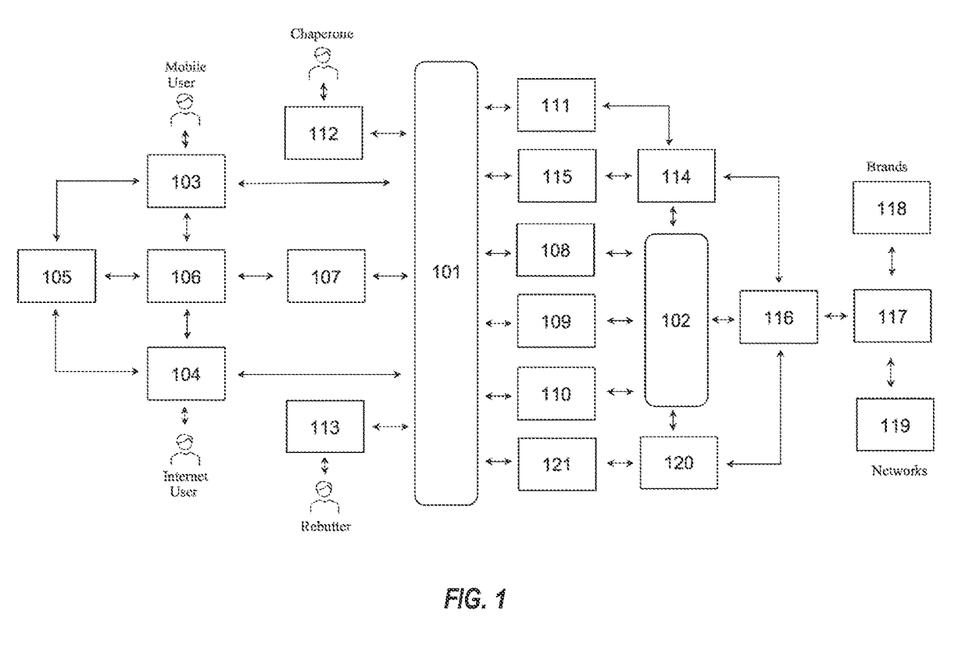
FIG. 1 illustrates a schematic of an embodiment of a system for a decentralized user controlled social media platform.

FIG. 1 depicts a schematic diagram of a decentralized user controlled social media platform system 100. The depicted schematic includes a front end decentralized social media platform 101. The back end decentralized social media platform 102 provides an API and user interface for both cloud-based storage accounts and users to access the decentralized user controlled social media platform system 100. The decentralized user controlled social media platform system 100 also includes a back end decentralized social media platform 102. The back end decentralized social media platform 102 provides functionality to the decentralized user controlled social media platform system 100 such as monetization analytics, machine learning functions, filtering functions, blockchain functions, envelop functions, and various other functions within the decentralized user controlled social media platform system 100.

The depicted decentralized user controlled social media platform system 100 may also include a smart phone 103. The smart phone may be owned and operated by the user of the decentralized user controlled social media platform. One will appreciate that the smart phone 103 may not be integrated within the decentralized user controlled social media platform system 100 itself but may instead only interact with and access the decentralized user controlled social media platform—for example, to post content or review content. Similar, the depicted decentralized user controlled social media platform system 100 may also include a web browser 104 that can be used by a user to interact with the decentralized user controlled social media platform.

In at least one embodiment, the decentralized user controlled social media platform system 100 also comprises user specified cloud infrastructure 105. As described herein the user specified cloud infrastructure 105 comprises various user-controlled cloud storage accounts. The user-controlled cloud storage accounts may be operated by third-party cloud storage providers, such as Dropbox™, Onedrive™, Google Drive™, iCloud™, and other similar cloud storage providers. Additionally, in some embodiments, the user-controlled cloud storage accounts may comprise a cloud storage account that is privately hosted by the user using a service such as NextCloud™, SeaFile™, ownCloud™, or through a standard file sharing protocol such as an ftp site.

The depicted decentralized user controlled social media platform system 100 also includes a centralized cloud infrastructure 106. The centralized cloud infrastructure 106 functions as an API and service for linking the various user devices (e.g., the smart phone 103 and web browser 104) and the user specified cloud infrastructure 105 in the front end decentralized social media platform 101. In some embodiments, the centralized cloud infrastructure 106 may also cache user content from the user specified cloud infrastructure 105 for faster download to the front end decentralized social media platform 101 and to the user. In such a case, however, the cached items may be kept in volatile memory such that the user content is never written to a disk for storage.

The depicted decentralized user controlled social media platform system 100 also comprises encrypted URLs 107. In at least one embodiment, the encrypted URLs comprise encrypted content that includes authentication tokens to accounts in the user specified cloud infrastructure 105. For example, a user accessing a page within the decentralized user controlled social media platform may access it through an encrypted URL. The encrypted URL itself may contain the necessary information to authenticate with one or more user-controlled cloud storage accounts in order to access the user account for display within the social media platform.

In at least one embodiment, the encrypted URLs 107 comprise custom generated addresses that are hashed using a component of the user's login information. As such, in order for the user's computer to read the login information the computer must decrypt at least a portion of the encrypted URL using the component of the user's login information. Such a system prevents users from sharing encrypted URLs and allowing non-authenticated users from accessing user content. Further, in at least one embodiment, even after an encrypted URL is decrypted, the decrypted URL does not provide enough information to access the user specified cloud infrastructure 105 of another user.

Additionally, in at least one embodiment, the decentralized user controlled social media platform system 100 utilizes smart envelopes 108 (also referred to herein as "digital envelopes" or "envelopes"). The smart envelopes 108 function as a template within the decentralized user controlled social media platform system 100 that link to user content stored within the user specified cloud infrastructure 105. Additionally, the smart envelopes 108 also store metadata specific to the decentralized user controlled social media platform system 100. For example, the smart envelopes 108 may also store data relating to user comments, likes, dislikes, and other data that is generated in relationship to displayed user content within the decentralized user controlled social media platform system 100. When a user reports or reshares content from the decentralized user controlled social media platform system 100, a new envelope 108 is created. The original user content however is left stored within the user specified cloud infrastructure 105.

Figure 2:
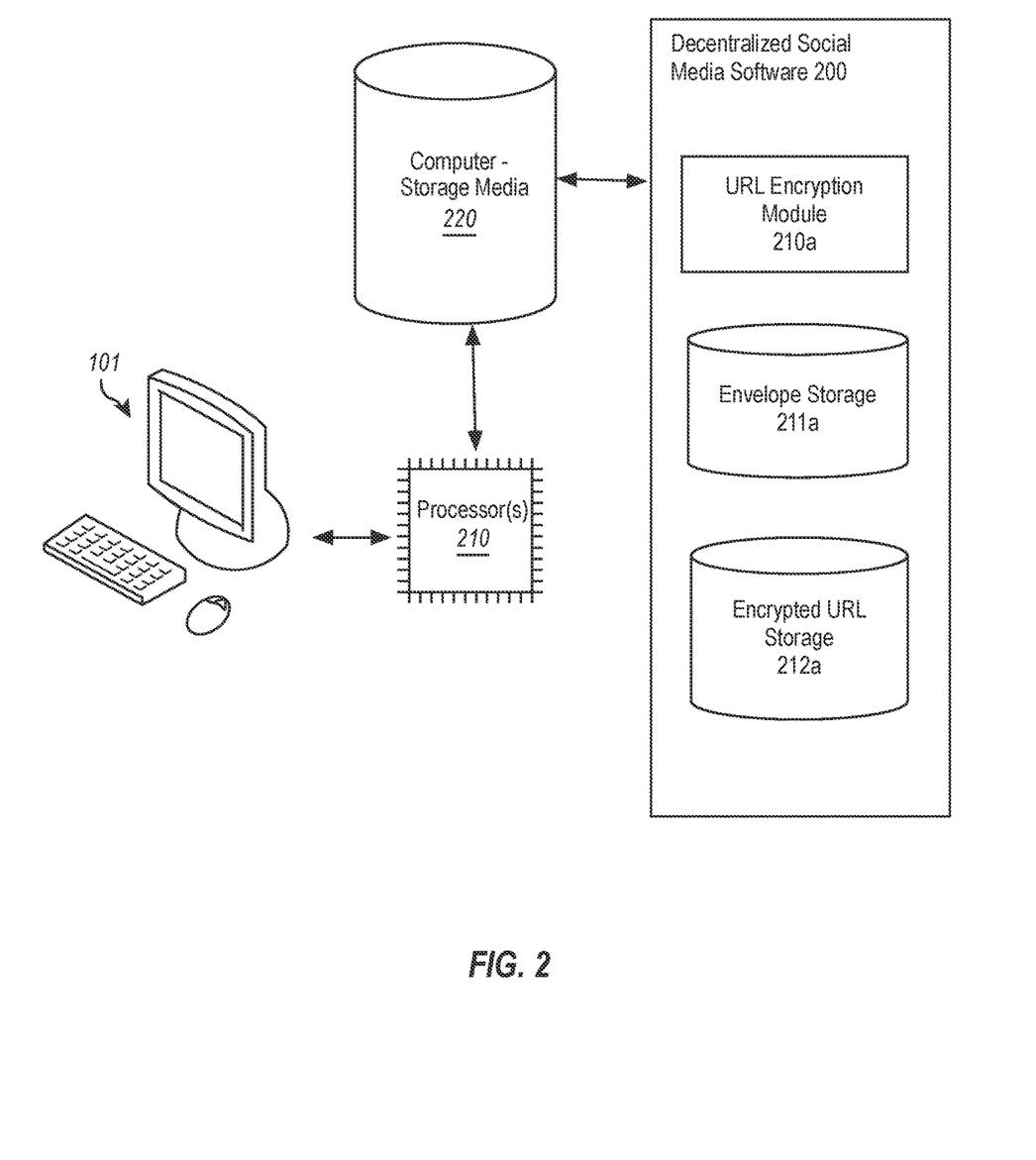
FIG. 2 illustrates a schematic of a decentralized social media software application.

FIG. 2 illustrates a schematic of a decentralized social media software application. In this depiction, the front end decentralized social media platform 101 is shown as a single computer, but one of skill in the art will appreciate that this is merely for example and explanation. In practice, the front end decentralized social media platform 101 may be executed on a server, on a distributed system, on multiple different servers concurrently, or in any number of other conventional configurations. The depicted front end decentralized social media platform 101 comprises one or more processors 210 and computer-storage media 220. As used herein, "computer-storage media" refers to non-transitory storage media.

The front end decentralized social media platform 101 is executing a decentralized social media software application 200. The application includes a URL encryption module 210a. The URL encryption module may comprise an API, library, software code, and/or other executable function that is configured to encrypt the location and access credentials for a user-provided item stored within the user's cloud storage service of choice. Once encrypted, the decentralized social media software application 200 stores the encrypted URLs within encrypted URL storage 212a for access by users requesting the associated data.

Additionally, the decentralized social media software application 200 comprises envelope storage 211a. The envelope storage 211a comprises digital envelopes that have been created by users. The digital envelopes function as described above. In at least one embodiment, the digital envelopes may be stored in an xml format that allows for easy access and reading by a wide variety of computer systems and software applications.

The decentralized user controlled social media platform system 100 may also utilize blockchain 109. Block chain technology provides a platform through which a public ledger can be hosted over a network. In at least one embodiment, the public ledger may comprise the encrypted URLs. As such, each URL "owner" maintains public possession of both the URL and the content associated with it.

Figure 3:
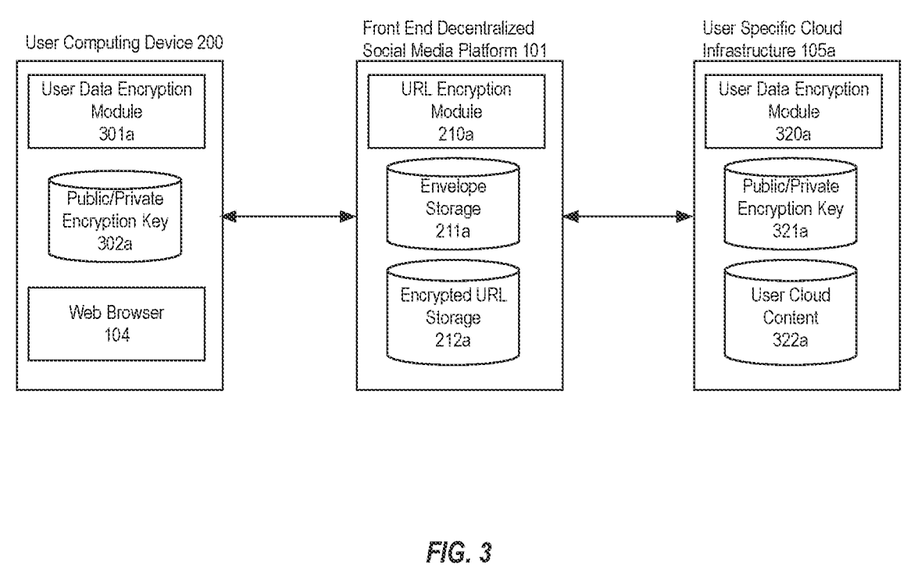
FIG. 3 illustrates a schematic of a decentralized user controlled social media platform system.

FIG. 3 illustrates a schematic of a decentralized user controlled social media platform system. The depicted schematic includes a user computing device 200, a front end decentralized social media platform 101, and a user specific cloud infrastructure 105a. While the depicted schematic shows only a single user computer device 200 and a single user specific cloud infrastructure 105a, in various embodiments any number of these components may function within the disclosed system.

In at least one embodiment, a user within a user specific cloud infrastructure 105a chooses to share some user cloud content 322a. The user cloud content 322a is stored within the user specific cloud infrastructure 105a. Additionally, the user cloud content 322a may be protected by permissions or authentication requirements. Upon sharing the user cloud content 322a through the front end decentralized social media platform 101, the user data encryption module 320a encrypts a packet that contains the location of the user cloud content 322a and an authentication token needed to access the user cloud content 322a.

The authentication token may comprise a user name and password or a token generated by the user specific cloud infrastructure 105a. Further, in at least one embodiment, the authentication token and the location of the user cloud content 322a comprise the same information. For example, the authentication token may comprise a random string within a URL that indicates the location of the user cloud content 322a. Without the random strong in the address, a non-authenticated user would not be able to locate the user cloud content 322a. In any case, in at least one embodiment, at least the location of the user cloud content 322a is encrypted using a public/private pair encryption key 321a. The public/private pair encryption key 321a allows the location to be encrypted such that only the possessor of the private encryption key is able to decrypt the actual location of the user cloud content 322a.

In at least one embodiment, the encrypted URL is sent to the front end decentralized social media platform 101 so that it may be available to users of the platform. The front end decentralized social media platform 101 stores the encrypted URL within the encrypted URL storage 212a. In at least one embodiment, upon receiving a request from a user computing device 200 to access the user cloud content 322a, the front end decentralized social media platform 101 requests the user cloud content 322a associated with the encrypted URL from the user specific cloud infrastructure 105a. The user specific cloud infrastructure 105a then decrypts the URL and provides the content to the front end decentralized social media platform 101. The front end decentralized social media platform 101 then provides the user cloud content 322a to the user computing device 200.

At any time, should the owner of the user cloud content 322a wish to stop sharing the user cloud content 322a, the owner of the user cloud content 322a need to only delete the encrypted URL or instruct the user data encryption module 320a to no longer decrypt the target encrypted URL. Because the owner of the user cloud content 322a is the only individual with access to the unencrypted URL, no user will be able to access the user cloud content 322a without the owner's permission.

Additionally, in at least one embodiment, the front end decentralized social media platform 101 may also comprise a URL encryption module 210a. The URL encryption module 210a may be used to encrypt a URL before it is sent to a user computing device 200 so that only the user computing device 200 is able to decrypt the URL. For example, upon requesting access to user cloud content 322a, the front end decentralized social media platform 101 may access a public encryption key 302a associated with the user computing device 200. The front end decentralized social media platform 101 may have the public encryption key 302a previously stored or it may be provided by the user computing device 200 in conjunction with the request for the user cloud content 322a. The front end decentralized social media platform 101 may encrypt a pointer, or URL, associated with the user cloud content 322a using the computing device's public encryption key 302a.

Upon receiving the encrypted pointed or URL from the front end decentralized social media platform 101, the user computing device 200 can decrypt the pointer or URL with the private encryption key 302a. As such, once a pointer or URL is sent out by the front end decentralized social media platform 101, only the intended user computer device 200 can access the pointer or URL received by the front end decentralized social media platform 101. Further, once the user computing device 200 attempts to access the user cloud content 322a, the owner of the user cloud content 322a still has complete control over whether the user cloud content 322a will be accessible within the front end decentralized social media platform 101.

Returning now to FIG. 1, the decentralized user controlled social media platform system 100 may also comprise a buffering function 110. The buffering function 110 may be performed by volatile or non-volatile memory at the front end decentralized social media platform 101. When particular user content is being heavily accessed, the decentralized user controlled social media platform system 100 may copy the content in volatile memory. The content can then be buffered and more efficiently shared with users on the decentralized user controlled social media platform system 100.

In at least one embodiment, decentralized user controlled social media platform system 100 also comprises a filter versus follow function 111. The filter versus follow function 111 determines which content is displayed to a particular user. For example, the filter versus follow function 111 may interact with an artificial intelligence function 114 for identifying objectionable material (e.g., pornography, illicit material, etc.) based upon an image analysis, textual analysis, metadata, or other information associated with the objectionable material.

In some embodiments, each user is associated with a user-specific filter that is stored within the user specific cloud infrastructure 105 (e.g., within the user's Dropbox™ account). A user is able to provide the filter versus follow function 111 feedback and develop a customized user-specific filter. For example, a user may be able to provide the filter versus follow function 111 with seed information to create an initial user-specific filter. The seed information may comprise one or more presets that a user can select to indicate their initial filter preferences. For example, the presets may comprise one or more settings for pornographic material, a setting for crude language, an age-based setting, and/or other settings related to various different topics. Additionally or alternatively, the user-specific filter may dynamically adjust to the user's preferences based upon receiving feedback from the user. For example, the user may select buttons indicating they like or dislike particular content, the user may select buttons that block specific content, or the user may simply have a higher likelihood to selecting particular types of content. Overtime the artificial intelligence function 114 observes these user interactions and develops a custom user-specific filter that information the actions of the filter versus follow function 111.

In at least one embodiment, the decentralized user controlled social media platform system 100 also comprises chaperones 112. As used herein a chaperone 112 comprises a user that observes and/or controls, at least in part, the interactions of another user within the decentralized user controlled social media platform system 100. For example, a teenage child may wish to participate in the decentralized user controlled social media platform system 100. One of the child's parents, may designate themselves as a chaperone 112 for the child. As the child interacts with the decentralized user controlled social media platform system 100, the chaperone is able to control the content presented to the child and observe the child's interactions within the decentralized user controlled social media platform system 100. For example, the chaperone 112 may be able to review all messages that the child leaves on the decentralized user controlled social media platform system 100. Additionally, the chaperone 112 may be able to control and adjust the filter versus follow function 111 associated within the child's account. For example, the chaperone 112 can set the child's user-specific filter to the most restrictive level with regards to pornographic material. As such, the chaperone 112 can largely control and supervise the content presented to the child and also observe and control the content shared by the child.

In at least one embodiment, similar to the chaperone 112, the decentralized user controlled social media platform system 100 may comprise one or more rebutters 113. As used herein a rebutter 113 comprises a user that has been designated within the decentralized user controlled social media platform system 100 as a trusted user. The rebutter 113 is provided with a special ability to "rebut" misinformation within the platform. For example, while any user may be able to comment on a post, a rebutter 113 is provided with a unique visual designation and/or unique controls when rebutting a post. For example, a rebutter's comments may be placed in a position of greater prominence on a post. Additionally, a rebutter's comments may be weighed more heavily by the filter versus follow function 111 such that the rebutter's comments can cause more users to see the rebutted content or fewer users to see the rebutted content based upon the rebutter's comments.

As discussed above, in some embodiments, the decentralized user controlled social media platform system 100 comprises an artificial intelligence function 114. The artificial intelligence function 114 may comprise an image recognition component that is configured to analysis and classify images. In particular, the image recognition component may be configured to identify and classify objectionable material. The image recognition function may comprise one or more of the following algorithms: faster region-based convolutional neural network, scale-invariant feature transform, principal component analysis, linear discriminant analysis, and/or any other useful image recognition algorithm.

In at least one embodiment, the decentralized user controlled social media platform system 100 also comprises a masking-Illicit-content-during-selection function 116. The masking-Illicit-content-during-selection function 115 leverages output from the artificial intelligence function 114 to identify illicit content that should be visually masked when displayed within the decentralized user controlled social media platform system 100.

In at least one embodiment, the decentralized user controlled social media platform system 100 comprises a monetization analytics function 116. The monetization analytics function 116 may perform two functions. First, the monetization analytics function 116 may monetize advertisements served to users on behalf of the monetization analytics function 116. For example, various advertising brands 118 may operate with the decentralized user controlled social media platform system 100 through a programmatic advertising interface 117. Similarly, various advertising networks may operate with the decentralized user controlled social media platform system 100 through a programmatic advertising interface 117. The monetization analytics function 116 may utilize information provided by the artificial intelligence function 114 to identify advertisements to provide to specific users.

Further, the monetization analytics function 116 may operate with a user-controlled ad server 120. In some embodiments, a user is able to establish a user-controlled ad server 120 that has access to the user's content for advertising purposes. More specifically, the user may be able to establish a user-controlled ad server 120 that is able to exclusively advertise in conjunction with the user's displayed content. As such, when the user's content is displayed to another user, only the user's user-controlled ad server 120 is able to serve advertisements in conjunction with the user content. The user-controlled ad server 120 may also be customizable by the user to indicate what types of advertisements the user will allow. The user may also receive at least a portion of the monetization that is generated by the user's user-controlled ad server 120. For example, the user income accounting function 121 may track the amount of money generated by the user's content. This money can then be directly paid to the user. As such, the user may maintain complete control over their own content from an advertising perspective.

In various embodiments, the decentralized user controlled social media platform system 100 comprises a computer system for accessing a decentralized user controlled social media platform. The computer system comprises one or more processors and one or more computer-readable media having stored thereon executable instructions that when executed by one or more processors cause the computer system to perform various actions. For example, the computer system will receive, from an user computing device, a user authentication token for the decentralized user controlled social media platform. The computer system also determines that the user authentication token is valid for access to a user account at the decentralized user controlled social media platform.

The computer system then requests, through a network connection, content from a plurality of remote servers. The remote servers may comprise third-party cloud storage services. Each of the plurality of remote servers requires a unique remote server authentication token to access a portion of the content stored at the respective remote server. The unique remote server authentication tokens comprise authentication credentials for the third-party cloud storage services. For example, each user of the decentralized user controlled social media platform system 100 associates one or more user-controlled cloud storage services with their account. The one or more user-controlled cloud storage services are associated with user-specific authentication credentials (e.g., login name and password).

In at least one embodiment, at least a portion of the user-specific authentication credentials are stored in the user specified cloud infrastructure 105. For instance, when a user logs into the decentralized user controlled social media platform system 100, the computer system may create a prompt for the user to enter authentication credentials for a particular user specified cloud infrastructure 105. Once the authentication credentials are entered, the computer system can access the users cloud storage account and download a list of any other cloud storage accounts and authentication credentials associated with the user account.

Once the computer system receives access to the plurality of remote servers (e.g., third-party cloud storage accounts), the computer system communicates to the user computing device (e.g., smart phone 103) the content received from the plurality of remote servers.

In at least one embodiment, each of the plurality of remote servers is controlled by a different user of the decentralized user controlled social media platform 100. For example, thousands or millions of users of the decentralized user controlled social media platform system 100 may each have their own third-party cloud accounts associated with the social media platform. The computer system may have expiring authentication tokens to access each of the third-party cloud accounts. For example, a user may be able to provide the decentralized user controlled social media platform 100 with their authentication credentials for a specified period of time. After the specified period of time, the authentication credentials expire, and the user may provide authentication credentials for another period of time. Accordingly, each user maintains complete control over their own content, but the decentralized user controlled social media platform 100 is able to pull content from the users for sharing with others for limited periods of time.

In at least one embodiment, the computer system (e.g., front end decentralized social media platform 101) receives a data file, from the user computing device (e.g., from web browser 104), for upload into the decentralized user controlled social media platform. Upon receiving the data file, the computer system (e.g., the back end decentralized social media platform 102) identifies a particular unique remote server authentication token associated with the user account. The particular unique remote server authentication token comprises authentication credentials for a third-party cloud storage account. The computer system (e.g., front end decentralized social media platform 101) then accesses, through a network connection a particular remote server (e.g., the user's third-party cloud storage account) selected from the plurality of remote servers. The particular remote server is accessed using the particular unique remote server authentication token. The computer system (e.g., front end decentralized social media platform 101) uploads the data file to the particular remote server.

In at least one embodiment, a computer system for enabling user specified cloud computer infrastructure for the decentralized user controlled social media platform system 100 comprises one or more processors and one or more computer-readable media having stored thereon executable instructions that when executed by one or more processors cause the computer system to perform various actions. For example, the computer system (e.g., front end decentralized social media platform 101) receives a registration request that comprises a unique remote server authentication token associated with a remote server storage account (e.g., a user controlled third-party cloud storage account). The computer system associates a unique remote server authentication token associated with the remote server storage account with a user account within the user specified cloud computer infrastructure. For example, the computer system will associate a user's cloud storage account credentials with the user's social media platform account. The computer system then displays a page on the social media platform. The page comprises information from the remote server storage account.

In at least one embodiment, the decentralized user controlled social media platform system 100 comprises a computer system for constructing encrypted Uniform Resource Locators (URLs) that include content location identifiers plus credentials and other related information for accessing user generated and controlled content on the user specified cloud computer infrastructure 105. The URLs are used to serve content from each user's cloud storage accounts to the social media platform for others to view.

For example, and as explained above, the decentralized user controlled social media platform system 100 can create encrypted URLs including content location and credentials.

The encrypted URL for the decentralized user controlled social media platform system 100 may contain encrypted data for a user-controlled cloud storage account. Specifically, the URL may contain an encrypted authentication token for the user-controlled cloud storage account. The authentication token may be encrypted with a public encryption key associated with the user and stored by the decentralized user controlled social media platform system 100, while the user maintains control of the private encryption key. As such, as users access the social media platform and are served content from various users' social media storage accounts the actual URLs being loaded are secure so that users are not given indiscriminate access to the content of other users. Additionally, in at least one embodiment, each user is able to delete the private encryption key associated with their content, which prevents other users from being able to decrypt the URL content and access the user's third-party cloud storage account.

The decentralized user controlled social media platform system 100 may also be able to update the URL in the event the location of the content is changed by a user. For example, the decentralized user controlled social media platform system 100 may be configured to scan content within the user specified cloud infrastructure 105 on a periodic basis. Upon detecting that some content has changed, the decentralized user controlled social media platform system 100 identifies whether the associated user specific encryption key is still available. If it is available, the decentralized user controlled social media platform system 100 generates a new encrypted URL with an updated location associated with the content.

In at least one embodiment, a decentralized user controlled social media platform system 100 comprises a computer-implemented method, executed on one or more computers, for creating dynamic social media posts. The decentralized user controlled social media platform system 100 creates a first digital envelope for content. The first digital envelope comprises a digital template for posting the content within a social media post. For example the digital envelope may comprise an encrypted URL pointing to user-controlled content and metadata unique to the envelope. For example, the metadata comprises user comments relating to the shared content and likes/dislikes associated with the content.

The decentralized user controlled social media platform system 100 stores the first digital envelope within a social media platform storage medium. Similarly, the decentralized user controlled social media platform system 100 stores the content within a third-party user-controlled cloud storage account. In response to receiving a report indication from another user, the decentralized user controlled social media platform system 100 creates a second digital envelope but does not replicate the content. As such, when content is reshared within the decentralized user controlled social media platform system 100, the original user still maintains complete control over the actual content because the actual content continues to only be shared from the user's own user-controlled cloud storage account.

The decentralized user controlled social media platform system 100 may also comprise a computer system for implementing user specified filters for determination of which content is displayed to a user from the decentralized user controlled social media platform. The computer system comprises one or more processors and one or more computer-readable media having stored thereon executable instructions that when executed by one or more processors cause the computer system to perform various actions. For example, the computer system can receive paraments for a user filter for content screening. The user filter is used to filter the content that is displayed to the user within the decentralized user controlled social media platform system 100.

The computer system also executes a computer vision analysis on content within the centralized user controlled social media platform based upon the parameters. For instance, the parameters may relate to the filtering of explicit material. The computer system saves the encrypted filter controlled by the user within in the user's cloud infrastructure. The encrypted filter comprises the parameters and variables associated with the computer vision analysis.

In at least one embodiment, a computer-implemented method, executed at one or more processors, for implementing a digital chaperone comprises establishing the chaperone relationship between a first user and a second user. The computer system receives user attributes for the second user. Additionally, the computer system implements a user-specific filter based upon the user attributes. When the user-specific filter identifies potentially objectionable content, the computer system displays the potentially objectionable content to the first user. The first user, acting as the chaperone, is then able to determine whether the content is appropriate for the second user. As explained above, in some embodiments, the user-specific filter utilizes computer vision and machine learning to filter content and enable the chaperone to monitor and approve or deny content and review efficacy of the filter.

In at least one embodiment, a computer-implemented method, executed on one or more processors, for monetizing a decentralized user controlled social media platform comprises analyzing content based on content filter attributes. The computer system analyzes users based on user filter attributes. Additionally, the computer system interfaces to programmatic advertising platforms and contracts with advertising networks for providing advertisements.

Figure 4:
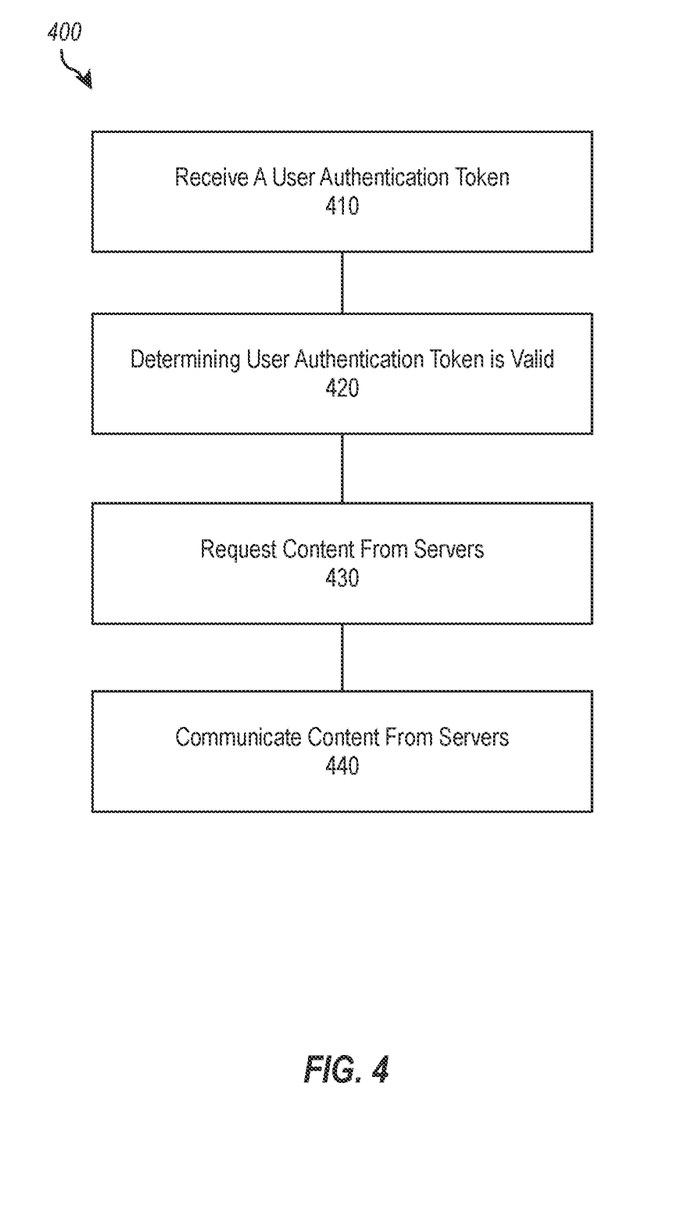
FIG. 4 illustrates a flow chart of steps in a method for accessing a decentralized user controlled social media platform.

FIG. 4 illustrates a flow chart of steps in a method 400 for accessing a decentralized user controlled social media platform. Method 400 includes a step 410 of receiving a user authentication token. Step 410 comprises receiving, from an user computing device, a user authentication token for the decentralized user controlled social media platform. Additionally, method 400 includes a step 420 of determining that the user authentication token is valid for access to a user account at the decentralized user controlled social media platform. Method 400 also includes a step 430 of requesting, through a network connection, content from a plurality of remote servers. Each of the plurality of remote servers requires a unique remote server authentication token to access a portion of the content stored at the respective remote server. Further, method 400 includes a step 440 of communicating, to the user computing device, the content received from the plurality of remote servers.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for accessing a decentralized user controlled social media platform, comprising:
    one or more processors; and
    one or more computer-readable media having stored thereon executable instructions that when executed by one or more processors cause the computer system to:
        receive, from a user computing device, a user authentication token for the decentralized user controlled social media platform;

determine that the user authentication token is valid for access to a user account at the decentralized user controlled social media platform;

request, through a network connection, content from a plurality of remote servers, wherein each of the plurality of remote servers requires a unique remote server authentication token to access a portion of the content stored at the respective remote server;

communicate, to the user computing device, the content received from the plurality of remote servers;

create a first digital envelope for content, the first digital envelope comprising a digital template for posting the content within a social media post;

store the first digital envelope within a social media platform storage medium;

store the content within a third-party user-controlled cloud storage account; and in response to receiving a repost indication from another user, create a second digital envelope but not replicating the content.

2. The computer system as recited in claim 1, wherein each of the plurality of remote servers is controlled by a different user of the decentralized user controlled social media platform.

3. The computer system as recited in claim 1, wherein each unique remote server authentication token is associated with a different user of the decentralized user controlled social media platform.

4. The computer system as recited in claim 1, wherein the executable instructions include instructions that are executable to configure the computer system to:

receive a data file, from the user computing device, for upload into the decentralized user controlled social media platform;

identify a particular unique remote server authentication token associated with the user account;

access, through a network connection a particular remote server selected from the plurality of remote servers, wherein the particular remote server is accessed using the particular unique remote server authentication token; and upload the data file to the particular remote server.

5. The computer system as recited in claim 1, wherein the executable instructions include instructions that are executable to configure the computer system to:

receive a registration request, the registration request comprising a unique remote server authentication token associated with a remote server storage account;

associate a unique remote server authentication token associated with the remote server storage account with a user account within a user specified cloud computer infrastructure; and display a page on a social media platform, the page comprising information from the remote server storage account.

6. The computer system as recited in claim 5, wherein the unique remote server authentication token may be associated a remote server storage account associated with any one of a set of remote server providers.

7. The computer system as recited in claim 1, wherein the executable instructions include instructions that are executable to configure the computer system to:

create encrypted URLs including content location and credentials; and update the encrypted URLs when a location of the content is changed by a user.

8. The computer system as recited in claim 1, wherein the executable instructions include instructions that are executable to configure the computer system to:

receive parameters for a user filter for content screening;

execute a computer vision analysis on content within the decentralized user controlled social media platform based upon the parameters; and save an encrypted filter controlled by a user within in a user's cloud infrastructure, wherein the encrypted filter comprises the parameters and variables associated with the computer vision analysis.

9. The computer system as recited in claim 1, wherein the executable instructions include instructions that are executable to configure the computer system to:

establish a chaperone relationship between a first user and a second user;

receive user attributes for the second user;

implement a user-specific filter based upon the user attributes; and when the user-specific filter identifies potentially objectionable content, display the potentially objectionable content to the first user.

10. A computer-implemented method, executed on one or more processors, for accessing a decentralized user controlled social media platform comprising:

receiving, from an user computing device, a user authentication token for the decentralized user controlled social media platform;

determining that the user authentication token is valid for access to a user account at the decentralized user controlled social media platform;

requesting, through a network connection, content from a plurality of remote servers, wherein each of the plurality of remote servers requires a unique remote server authentication token to access a portion of the content stored at the respective remote server;

communicating, to the user computing device, the content received from the plurality of remote servers;

creating a first digital envelope for content, the first digital envelope comprising a digital template for posting the content within a social media post;

storing the first digital envelope within a social media platform storage medium;

storing the content within a third-party user-controlled cloud storage account; and in response to receiving a repost indication from another user, creating a second digital envelope but not replicating the content.

11. The computer-implemented method as recited in claim 10, wherein each of the plurality of remote servers is controlled by a different user of the decentralized user controlled social media platform.

12. The computer-implemented method as recited in claim 10, wherein each unique remote server authentication token is associated with a different user of the decentralized user controlled social media platform.

13. The computer-implemented method as recited in claim 10, further comprising:

receiving a data file, from the user computing device, for upload into the decentralized user controlled social media platform;

identifying a particular unique remote server authentication token associated with the user account;

accessing, through a network connection a particular remote server selected from the plurality of remote servers, wherein the particular remote server is accessed using the particular unique remote server authentication token; and uploading the data file to the particular remote server.

14. The computer-implemented method as recited in claim 10, further comprising:
   receiving a registration request, the registration request comprising a unique remote server authentication token associated with a remote server storage account;
   associating a unique remote server authentication token associated with the remote server storage account with a user account within a user specified cloud computer infrastructure; and
   displaying a page on a social media platform, the page comprising information from the remote server storage account.

15. The computer-implemented method as recited in claim 14, wherein the unique remote server authentication token may be associated a remote server storage account associated with any one of a set of remote server providers.

16. The computer-implemented method as recited in claim 10, further comprising:
   creating encrypted URLs including content location and credentials; and
   updating a URL when a location of the content is changed by a user.

17. The computer-implemented method as recited in claim 11, further comprising:
   receiving parameters for a user filter for content screening;
   execute a computer vision analysis on content within the decentralized user controlled social media platform based upon the parameters; and
   saving an encrypted filter controlled by the user within in a user's cloud infrastructure, wherein the encrypted filter comprises the parameters and variables associated with the computer vision analysis.

18. A computer-readable media comprising one or more non-transitory physical computer-readable storage media having stored thereon computer-executable instructions that, when executed at a processor, cause a computer system to perform a method for accessing a decentralized user controlled social media platform, the method comprising:
   receiving, from a user computing device, a user authentication token for the decentralized user controlled social media platform;
   determining that the user authentication token is valid for access to a user account at the decentralized user controlled social media platform;
   requesting, through a network connection, content from a plurality of remote servers, wherein each of the plurality of remote servers requires a unique remote server authentication token to access a portion of the content stored at the respective remote server;
   communicating, to the user computing device, the content received from the plurality of remote servers;
   creating a first digital envelope for content, the first digital envelope comprising a digital template for posting the content within a social media post;
   storing the first digital envelope within a social media platform storage medium;
   storing the content within a third-party user-controlled cloud storage account; and
   in response to receiving a repost indication from another user, creating a second digital envelope but not replicating the content.

* * * * *